United States Patent Office 2,928,857
Patented Mar. 15, 1960

2,928,857

SELECTED TETRASUBSTITUTED MONOSILANES

Harold S. Holt, Wilmington, and Isaac Fletcher Walker, Hockessin, Del., assignors to E. I. du Pont de Nemours and Company, Wilmington, Del., a corporation of Delaware No Drawing. Application August 22, 1955
Serial No. 529,923

7 Claims. (Cl. 260—448.8)

This invention relates to organic compounds of silicon. More particularly, it relates to a new class of organosilanes containing polyfluoroalkoxy radicals.

Many organic materials are useful as lubricants. Among the most useful of these for this purpose are mineral oils and aliphatic esters of polycarboxylic acids. Certain polyfluorinated alcohols are also useful as lubricants. However, the hitherto known lubricants have not possessed as high stability at high temperatures as desired for certain applications, particularly for lubricating gas turbine engines.

This invention has as an object the preparation of new organic compounds. A further object is the preparation of new lubricants of attractive high temperature stability. A still further object is the preparation of new polish components and new polishes. Still another object is the preparation of new heat transfer media, new power transmission media and new shock absorber and recoil media. Other objects will appear hereinafter.

These objects are accomplished by the present invention of polyfluoroalkoxysilanes, i.e., compounds having one silicon atom to which is attached from one to three polyfluoroalkoxy radicals, the remaining valences of the silicon being attached to hydrocarbon radicals.

In the specification and claims the use in the term "polyfluoroalkoxysilane" of the prefix "poly" denotes a plurality of fluorine substituents in the alkoxy group and not a polymer of a fluoroalkoxysilane. The polyfluoroalkoxysilanes containing polyfluoroalkoxy groups derived from tetrafluoroethylene/alcohol telomers are an especially preferred group of the polyfluoroalkoxysilanes of this invention since they can be prepared from readily available intermediates and possess good lubricating properties at high temperatures. The polyfluoroalkoxysilanes of this invention have the following general formula: $R_xSi[OCH_2(CF_2)_nH]_y$, wherein R is a monovalent hydrocarbon radical free from aliphatic unsaturation, $n$ is 4, 6 or 8, $x$ and $y$ are positive integers from 1–3, inclusive, i.e., integers having a value of 1, 2, or 3, and the sum of $x+y$ equals 4.

The polyfluoroalkoxysilanes of this invention are prepared by reacting a polyfluoroalcohol, or its alkali metal alcoholate, with a hydrocarbochloro-, or -bromo, silane or by reacting the polyfluoroalcohol with a hydrocarboalkoxysilane. The reaction takes place at temperatures ranging from room temperature (about 25° C.) up to 250° C. or higher. The upper temperature limit is dependent only on the volatility of the fluoroalcohol being used. The reaction can be carried out at atmospheric pressure or at superatmospheric or subatmospheric pressures if desired. The reaction takes place in the presence or absence of an inert diluent.

In one embodiment of the invention, the polyfluoroalcohol is simply added to a stoichiometrically equivalent quantity of a hydrocarbochloro- or -bromosilane at ordinary or elevated temperatures and the reaction temperature is gradually increased in order to maintain a steady evolution of hydrogen chloride or bromide formed as a by-product. The heating is continued, for example, at 200–250° C., until evolution of hydrogen halide ceases. The reaction time required varies considerably, depending on the particular reactants being used and the operating temperature employed. Times ranging from a few hours, e.g., 2–3 hours, up to 10–20 hours or even longer are operable. In general, it is desirable to continue the reaction until it has gone to at least 90% completion as indicated by the substantial cessation of hydrogen halide evolution. The reaction mixture is then subjected to fractional distillation, the polyfluoroalkoxysilane being thereby separated from by-products and any unreacted material.

In another embodiment of the process of this invention, stoichiometric equivalents of the polyfluoroalcohol and a hydrocarboalkoxysilane are heated to the boiling point in the presence of an alcoholysis catalyst, e.g., a mixture of p-toluenesulfonic acid and calcium acetate, and the alcohol formed in the reaction is removed from the reaction mixture by distillation through a fractionating column. In this embodiment it is preferable to use a hydrocarboalkoxysilane in which the alkoxy group is derived from a lower aliphatic alcohol, e.g., methanol or ethanol, since these alcohols are more readily separated from the reaction mixture during the reaction. The reaction is continued until preferably about 90% of the theoretical quantity of alcohol is removed. The reaction mixture is then diluted with an inert organic solvent, e.g., toluene, and then washed with water to remove the catalyst. The washed organic layer is subjected to fractional distillation to isolate the polyfluoroalkoxysilane from the unreacted materials and by-products formed. In this method of making the products of this invention, it is often desirable to include in the reaction mixture an inert diluent which forms an azeotropic mixture with the alcohol formed as a by-product. This azeotrope is readily removed from the reaction mixture during the reaction. Suitable diluents of this type include benzene, toluene, and other hydrocarbons.

In addition to the specific catalyst mentioned above, other alcoholysis catalysts can be employed in the process. For example, sulfuric acid, litharge, and alkali metal alcoholates can also be used. When an acidic catalyst such as p-toluene sulfonic or sulfuric acid is used, it is also preferable to include in the reaction mixture a salt of a weak acid such as sodium or calcium acetate in order to improve the stability of the product during distillation.

The second method of preparing the polyfluoroalkoxysilanes by alcoholysis of a hydrocarboalkoxysilane is the preferred method when a product free of halogen acid is desired. In the methods employing a hydrocarbohalogenosilane as one of the reactants, there may be produced a small amount of halogen acid which makes the product corrosive to certain materials.

A third method which can be used to make the products of this invention comprises slowly adding, with stirring or agitation, a solution of an alkali metal alcoholate of the polyfluoroalcohol, e.g., the sodium polyfluoroalcoholate, in an inert solvent, e.g., diethyl ether, to an ether solution of a hydrocarbohalogenosilane. During the addition of the reactants the alkali metal halide formed as a by-product precipitates in the reaction mixture. The reaction takes place at room temperature, and stirring or agitation is continued for a short period, e.g., one-half to one hour, after the addition of the reactants is completed. A small amount of water is then added to flocculate the precipitated salt which is then filtered from the reaction mixture. The filtrate is subjected to fractional distillation whereby the polyfluoroalkoxysilane is isolated.

Polyfluoroalcohols useful as starting materials in this invention can be made by telomerization of tetrafluoroethylene with methanol, as described in U.S. Patent 2,559,628. The alkali metal alcoholates of these polyfluoroalcohols can be made by reaction of the polyfluoroalcohol with an alkali metal hydride, e.g., sodium hydride, in a reaction medium such as diethyl ether, or by reaction with the alkali metal in a diluent such as diethyl ether.

Hydrocarbohalogenosilanes and hydrocarboalkoxysilanes used as reactants in the process of this invention are well known. Hydrocarbohalogenosilanes and hydrocarboalkoxysilanes are commercially available and the commercial products may be employed in this invention.

The invention is illustrated further by the following examples in which the proportions of ingredients are expressed in parts by weight unless otherwise noted.

EXAMPLE I

A reaction vessel fitted with an electric heating mantle and with a fractionating column is charged with 350 parts (1.06 moles) of 1H,1H,7H-dodecafluoroheptanol (obtained from the telomerization of tetrafluoroethylene and methanol), 79 parts (0.53 mole) of dimethyldiethoxysilane, 130 parts of toluene, with 0.5 part of p-toluenesulfonic acid and 0.5 part of calcium acetate as catalysts. The reaction mixture is heated to the boiling point and the ethanol formed as a by-product is continuously removed in the form of its binary with toluene. The reaction is continued until 74% of the theoretical amount of the ethanol/toluene binary has been removed from the reaction mixture. The mixture is then washed with water to remove the catalyst and frictionally distilled.

There are obtained 88 parts of unreacted polyfluoroalcohol, 36 parts of intermediate material (the partially substituted silane), 196 parts of bis(1H,1H,7H-dodecafluoroheptyloxy)dimethylsilane boiling at 270° C. at atmospheric pressure, and 39 parts of residue. The yield of product represents 69% of that theoretically obtainable on the basis of the alcohol used. This bis(1H,1H,7H-dodecafluoroheptyloxy)dimethylsilane has a density of 1.62, a refractive index of 1.3284, a freezing point below −50° C., and it is unchanged by heating for six hours at 100° C. in the presence of water. After boiling in air for one hour, this compound is unchanged in appearance and in refractive index. The compound is noncorrosive to metals (copper, aluminum, brass or mild steel) when they are immersed in it at 250° C. for 24 hours.

EXAMPLE II

A reaction vessel is charged with 500 parts (1.5 moles) of 1H,1H,7H-dodecafluoroheptanol and preheated to 150° C. Over a period of 15 minutes there is added 106 parts (0.5 mole) of phenyltrichlorosilane. The temperature of the reaction mixture is gradually increased to 250° C. during a period of 2½ hours and held at this point for 90 minutes longer. The reaction mixture is then distilled without further treatment and there is obtained 398 parts of material boiling from 345 to 352° C. This is tris(1H,1H,7H-dodecafluoroheptyloxy)phenylsilane and is 72% of the amount theoretically obtainable from the alcohol used. This fluoroalkoxysilane thickens at −40° C. and sets to a glass at −60° C. Upon boiling in air for one hour, the refractive index of the tris(1H,1H,7H-dodecafluoroheptyloxy)phenylsilane, 1.3533, is unchanged, although the liquid has darkened considerably. The product has a density of 1.70.

EXAMPLE III

A reaction vessel is charged with 660 parts (2.0 moles) of 1H,1H,7H-dodecafluoroheptanol and 157 parts (1.0 mole) of diethyldichlorosilane and the mixture is heated gradually to 170° C. in 105 minutes. The temperature is then gradually increased during the following eight hours to 220° C. The reaction mixture is fractionally distilled and there is obtained 563 parts of bis(1H,1H,7H-dodecafluoroheptyloxy)diethylsilane boiling at 284–287° C. This corresponds to a yield of 75% of the theory based on the fluoroalcohol used. This product has a freezing point below −50° C. and is unchanged in heating in contact with water at 100° C. for six hours. Its density is 1.58. When boiled for one hour in air, this compound shows only very slight darkening and its refractive index, 1.3381, remains unchanged.

EXAMPLE IV

Sodium 1H,1H,7H-dodecafluoroheptanolate is prepared by slowly adding a solution of 332 parts (1 mole) of 1H,1H,7H-dodecafluoroheptanol in 283 parts of dry diethyl ether to a suspension of 24 parts (1.0 mole) of sodium hydride in 283 parts of diethyl ether over a period of 50 minutes. The reaction mixture is then stirred overnight at reflux temperature (about 20 hours at about 36° C.) to complete the reaction. This solution is then added with stirring over a one-hour period to a solution of 78.5 parts of diethyldichlorosilane (0.5 mole) dissolved in 142 parts of diethyl ether. The reaction mixture is stirred by a mechanical stirrer during this addition as the precipitation of sodium chloride as the by-product causes the mixture to thicken. After stirring for 40 minutes, 5 parts of water is added to flocculate the sodium chloride. The solution is filtered, stripped of ether and fractionally distilled. There is obtained 293 parts of bis(1H,1H,7H-dodecafluoroheptyloxy)diethylsilane, which is identical with that obtained in Example III. This corresponds to a yield of 78% of the theoretical. This product is not corrosive to metals (copper, brass, mild steel or aluminum) when they are immersed in it for 24 hours at 250° C.

EXAMPLE V

A reaction vessel is charged with 332 parts (1.0 mole) of 1H,1H,7H-dodecafluoroheptanol and 126.5 parts (0.5 mole) of diphenyldichlorosilane. A slow stream of nitrogen is passed through the reaction vessel, and the temperature of the mixture is gradually raised over a 17-hour period from 170° C. (the boiling point of the alcohol) to 230° C. The reaction mixture is washed with water, dilute sodium bicarbonate solution and again with water, and is then dried with anhydrous magnesium sulfate. On fractional distillation the principal fraction obtained amounts to 297 parts boiling at 157–160° C./0.5 mm. This is bis(1H,1H,7H-dodecafluoroheptyloxy)diphenylsilane. This material has a freezing point of −32° C., a boiling point at atmospheric pressure of 345° C., a density of 1.58, and refractive index of 1.4010. It is noncorrosive to metals (copper, aluminum, brass or steel) in a 24-hour test at 250° C.

EXAMPLE VI

A reaction vessel fitted with a fractionating column is charged with 350 parts (1.06 moles) of 1H,1H,7H-dodecafluoroheptanol and 59.3 parts (0.33 mole) of methyltriethoxysilane. A mixture of 0.5 part of calcium acetate and 0.5 part of p-toluenesulfonic acid is used as a catalyst in the mixture to promote alcoholysis. The mixture is heated to boiling and by-product ethanol is removed from the reaction mixture by distillation. A total of 39 parts of alcohol is recovered. This represents 89% of the alcohol theoretically obtainable on the basis of the methyltriethoxysilane used. The product is diluted with 173 parts of toluene, washed with water to remove catalysts, and the toluene solution is fractionally distilled. There are obtained 71 parts of unreacted fluoroheptanol, 24 parts of partially substituted silane, 217 parts of material boiling at 315–320° C. at atmospheric pressure, and 37 parts of residue. The portion boiling at 315–320° C. is tris(1H,1H,7H-dodefluoroheptyloxy)methylsilane. This corresponds to a yield of 63% based on the amount of alcohol used in the reaction. This fluoroalkoxymethylsilane has a density of 1.75 and is found to thicken at temperatures below −50° C. After boiling in air for one hour, this product has darkened considerably, but its refractive index has not changed (1.3242). After heating in water at 100° C. for six hours, this product is slightly turbid.

EXAMPLE VII

A reaction vessel fitted with a fractionating column and an electric heater is charged with 223 parts (0.52 mole) of 1H,1H,9H - hexadecafluorononanol, 37 parts (0.25 mole) of diethoxydimethylsilane and 173 parts of toluene with 0.5 part of p-toluenesulfonic acid and 0.5 part of calcium acetate as alcoholysis catalysts. The reaction mixture is heated to the boiling point, and by-product ethanol is removed from the reaction mixture as the ethanol-toluene binary. In 3½ hours 95% of the theoretical amount of ethanol-toluene binary is obtained. The reaction mixture is washed with water, stripped of solvent and fractionally distilled. There is obtained 55 parts of bis(1H,1H,9H-hexadecafluorononyloxy)dimethylsilane, boiling at 170–180° C. at 3 mm. pressure. This product boils at 350° C. at atmospheric pressure and its freezing point is 8° C. It has a refractive index of 1.3280 and a density of 1.64.

The invention is illustrated above in the preparation of certain polyfluoroalkoxyhydrocarbosilanes. However, the invention is generic to monosilanes having all the silane hydrogens replaced by hydrocarbon radicals and polyfluoroalkoxy radicals, there being at least one but no more than three of each and their number totalling four.

In the processes of the various examples given above the polyfluoroalkanols specified can be replaced by other polyfluoroalkanols including 1H,1H,5H-hexafluoropentanol.

In the aspect of the invention wherein a hydrocarbohalogenosilane is employed as an intermediate there may be employed any monosilane having all four of the silane hydrogens replaced and these by hydrocarbon radicals free of nonaromatic, i.e., nonbenzenoid unsaturation and by halogen atoms of atomic number in the range 17–35 there being at least one of each such radical, i.e., compounds of the formula $R_xSiX_y$, wherein R is a monovalent hydrocarbon radical free from aliphatic unsaturation, including alkyl, aryl, cycloalkyl, X is chlorine or bromine, and $x$ and $y$ are positive integers from 1 to 3, with $x+y$ equal to 4. Thus there may be used, in the processes illustrated in Examples II and V, hydrocarbohalogenomonosilanes as above defined including di-n-propyldichlorosilane, n-dodecyltrichlorosilane, tricyclohexylchlorosilane, triphenylbromosilane, dioctadecyldichlorosilane, and hexadecyltrichlorosilane.

Another aspect of the invention wherein alkoxyhydrocarbosilanes are employed as the silane intermediate there may be employed, instead of the specific hydrocarboalkoxysilanes used in Examples I, VI and VII, any monosilane having all four silane hydrogens replaced and these by hydrocarbon radicals free from nonaromatic unsaturation and by alkoxy radicals, preferably of up to four carbon atoms, there being at least one each of such radicals, i.e., any alkoxyhydrocarbosilane of the general formula $R_xSi(OR')_y$, wherein R is a monovalent hydrocarbon free from aliphatic unsaturation, R' is an alkyl group, preferably of 1 to 4 carbon atoms, which forms an alcohol R'OH having a boiling point lower than the polyfluoroalcohol being used, $x$ and $y$ are positive integers from 1 to 3, with the sum $x+y$ equal to 4, including trimethoxymethylsilane, butoxytri-n-butylsilane, dimethoxydicyclohexylsilane and isopropoxytrimethylsilane.

Thus there are obtained, using the intermediates and methods above given, hydrocarbopolyfluoroalkoxymonosilanes including tris(1H,1H,5H-octafluoropentyloxy)-octadecylsilane.

The polyfluoroalkoxysilanes of this invention have a wide variety of applications. In view of their high thermal stability and good lubricating qualities they are of great value as lubricants, especially for use at high temperatures. The value of these products as lubricants is shown by the results of their tests in the Almen extreme pressure lubricant testing machine (a description of this apparatus and of the method of testing lubricants in it are given in American Petroleum Institute, Section III, Proceedings of the 13th Annual Meeting, November 1932, pp. 119–120). The results of tests in this machine of several of the polyfluoroalkoxysilanes of this invention are tabulated below. For purposes of comparison, the results of the same test made on unmodified hydrocarbon oils, on a hydrocarbon oil modified with 1% of a commercial lubricant additive consisting of a mixture of mono- and dialkylphosphates, and on a commercial ester lubricant are also included in the table.

Table

| Compound | Almen Test Machine Lead in lb./in.² |
|---|---|
| Bis(1H,1H,7H-dodecafluoroheptyloxy)-diethylsilane | 19,500 |
| Bis(1H,1H,7H-dodecafluoroheptyloxy)-dimethylsilane | 8,500–11,000 |
| Tris(1H,1H,7H-dodecafluoroheptyloxy)-phenylsilane | 8,500–11,000 |
| Unmodified hydrocarbon oils (range of products) | 3,000–7,000 |
| Hydrocarbon oil modified with 1% of a mixture of mono- and dialkylphosphates | 20,000 |
| Di(2-ethylhexyl) sebacate | 6,000 |

For lubrication purposes, polyfluoroalkoxyhydrocarbosilanes in which the polyfluoroalkoxy group is derived from a polyfluoroalcohol having seven carbon atoms are especially valuable, since these particular compounds possess the desirable combination of good lubricating properties with low freezing point and high boiling point. They are superior for this use to the polyfluoroalcohols from which they are derived because of their lower volatility at high temperatures. For example, 1H,1H,5H-octafluoropentanol and 1H,1H,7H-dodecafluoroheptanol are liquids at room temperature and boil at 140–143° C. and 170–175° C. at atmospheric pressure, respectively, and are too volatile for high temperature lubricants. Although higher molecular weight polyfluoroalcohols are less volatile at high temperature, e.g., 1H,1H,9H-hexadecafluorononanol boils at 198–203° C., they are solid at room temperature. This limited temperature range over which these polyfluoroalcohols are liquid, and their volatility restrict their use as lubricants, particularly in high temperature applications.

The products of this invention, preferably those boiling above 200° C., are also useful components in liquid polishes for glass and painted surfaces, and in easy rubbing, self-polishing waxes.

A composition useful for the preparation of liquid polishes is prepared from the following ingredients:

|  | Grams |
|---|---|
| Bis(1H,1H,7H-dodecafluoroheptyloxy)diethylsilane | 5 |
| Diethylcyclohexylammonium dodecylsulfate | 2 |
| β-Butoxyethanol | 20 |
| Methanol | 23 |

For use, this composition is diluted with ten parts of water to form a clear dispersion which is sprayed on glass or painted surfaces and is then wiped off to give a clean surface.

An easy rubbing, self-polishing wax composition is prepared as follows. A mixture of 150 g. of xylene, 5 g. of polyethylene wax (having a density of 0.920–0.926, and a viscosity at 125° C. of 100–200 poises), 3 g. of beeswax, 3 g. of aluminum stearate, and 10 g. of bis-(1H,1H,7H-dodecafluoroheptyloxy)diethylsilane is heated until a uniform solution is obtained. To this solution is added 10 g. of a finely divided nonabrasive silica aerogel, which serves as an indicator for the treated surface. This composition is wiped on the surface to be waxed, allowed to dry, and then wiped off to leave a highly polished film on the surface treated.

All the products of this invention have high densities and this particular property makes them useful as power transmission fluids. They also have high compressibilities which make them of value in shock absorbers and recoil mechanisms. In this utilization it is advantageous to incorporate as stabilizers basic organic materials such as morpholine, pyridine, triethanolamine, quinoline, carbazole, etc., in amount from one to ten percent by weight of the polyfluoroalkoxysilane. Extreme pressure additives and viscosity modifiers can also be incorporated if desired.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A tetrasubstituted monosilane, the substituents being hydrocarbon groups free from nonbenzenoid unsaturation and polyfluoroalkoxy groups of the formula $H(CF_2)_nCH_2O-$, where $n$ is an even positive integer of 4 to 8, inclusive, there being at least one each of said hydrocarbon and said polyfluoroalkoxy groups.

2. A tetrasubstituted monosilane, the substituents being 1H,1H,7H-dodecafluoroheptyloxy groups and hydrocarbon groups with at least one each of said groups and with the hydrocarbon group free from nonbenzenoid unsaturation.

3. Bis(1H,1H,7H - dodecafluoroheptyloxy)dimethylsilane.

4. Tris(1H,1H,7H-dodecafluoroheptyloxy)phenylsilane.

5. Bis(1H,1H,7H-dodecafluoroheptyloxy)diethylsilane.

6. Bis(1H,1H,7H - dodecafluoroheptyloxy)diphenylsilane.

7. Bis(1H,1H,9H-hexadecafluorononyloxy)dimethylsilane.

References Cited in the file of this patent

UNITED STATES PATENTS

| | | |
|---|---|---|
| 2,643,263 | Morgan | June 23, 1953 |
| 2,643,964 | Smith-Johannsen | June 30, 1953 |
| 2,777,870 | McBee et al. | Jan. 15, 1957 |

UNITED STATES PATENT OFFICE

CERTIFICATE OF CORRECTION

Patent No. 2,928,857                                         March 15, 1960

Harold S. Holt et al.

It is hereby certified that error appears in the printed specification of the above numbered patent requiring correction and that the said Letters Patent should read as corrected below.

Column 3, line 29, for "frictionally" read -- fractionally --; column 4, lines 68 and 69, for "-dodefluoroheptyloxy" read -- -dodecafluoroheptyloxy --; column 5, line 50, for "Another" read -- In another --.

Signed and sealed this 6th day of September 1960.

(SEAL)
Attest:

ERNEST W. SWIDER                                    ROBERT C. WATSON
Attesting Officer                                         Commissioner of Patents